UNITED STATES PATENT OFFICE.

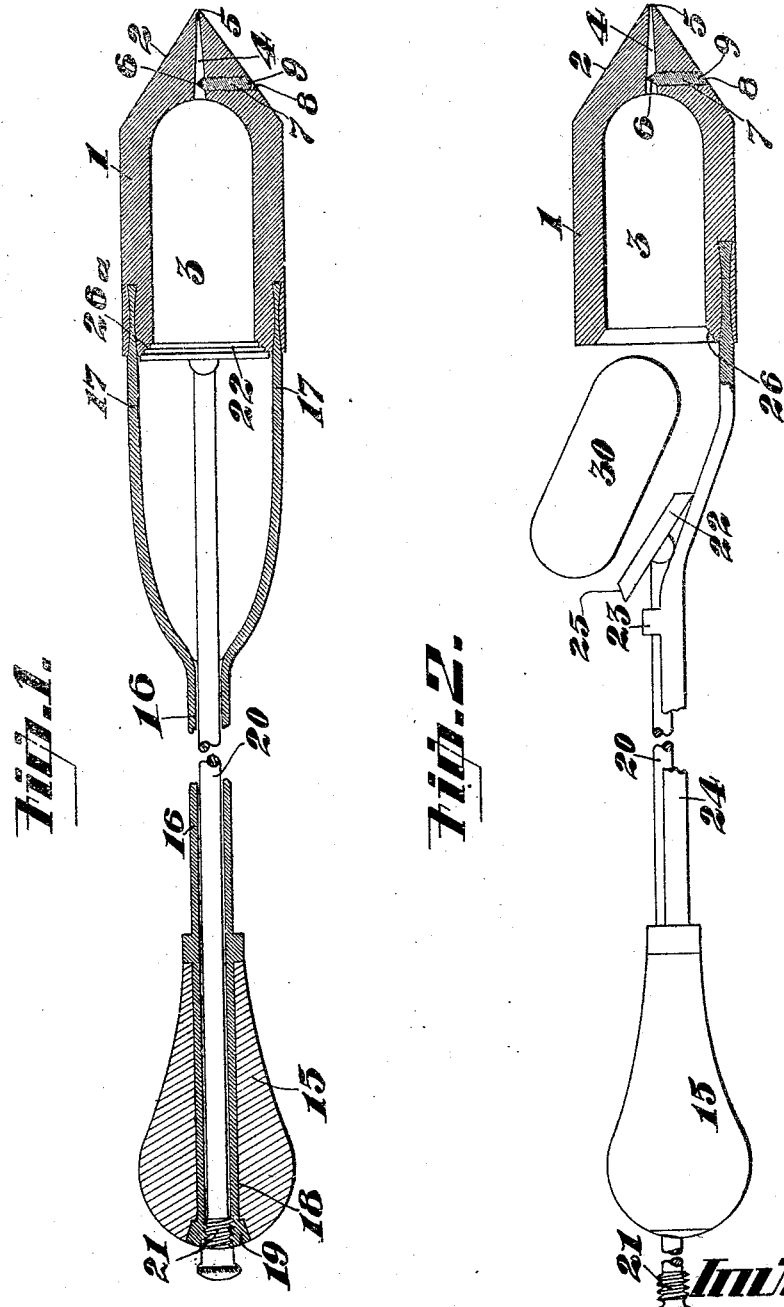

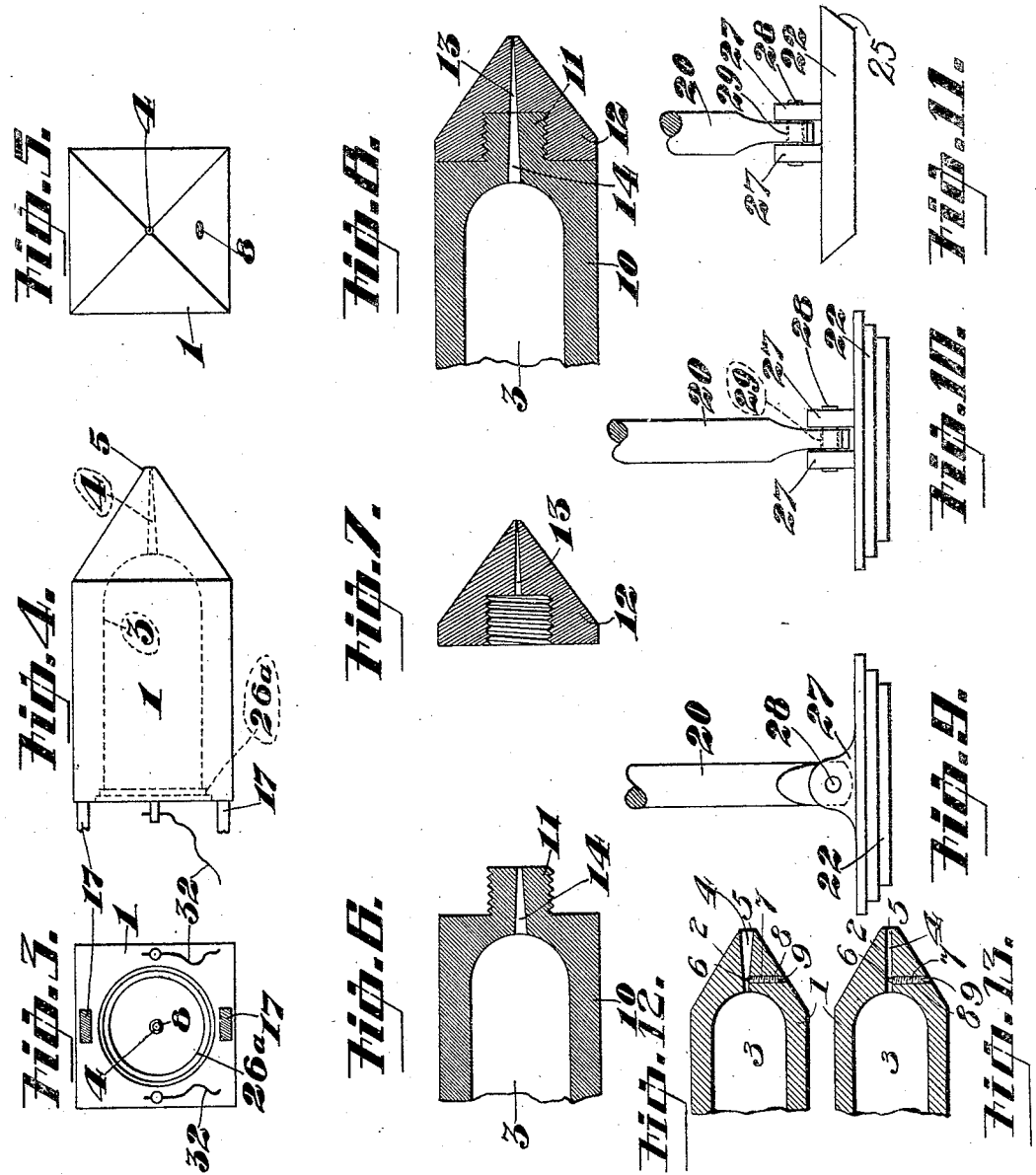

HOWARD G. MEAD, OF ST. LOUIS, MISSOURI, ASSIGNOR TO NATIONAL VENEER PACKAGE COMPANY, OF ST. LOUIS, MISSOURI, A CORPORATION OF MISSOURI.

SOLDERING DEVICE.

944,805.   Specification of Letters Patent.   Patented Dec. 28, 1909.

Application filed August 19, 1908. Serial No. 449,238.

*To all whom it may concern:*

Be it known that I, HOWARD G. MEAD, a citizen of the United States, residing at the city of St. Louis and State of Missouri, have invented certain new and useful Improvements in Soldering Devices, of which the following is a specification, reference being had therein to the accompanying drawings.

This invention consists in a soldering device in connection with which a reservoir for molten solder is provided, and is herein shown and described as a tool constructed with a hollow soldering-head, instead of the usual solid head, molten solder being contained within the head.

Subordinate objects are to provide means to control the rate at which the molten solder is applied to the joint or metal to be soldered; to provide novel means for heating both the solder and the soldering-head; and to provide a soldering-head which, when desired, is composed of a plurality of pieces, some of which pieces may be made of different metal than the others.

In the drawings forming part of this specification, in which like numbers of reference denote like parts wherever they occur, Figure 1 is a longitudinal sectional view of a tool embodying the invention; Fig. 2 is a similar view of a modified form, the handle being shown in elevation, not in section, the solder-holding reservoir being open, and a different form of cap for sealing said reservoir being employed; Figs. 3, 4, and 5, are, respectively, top, side, and bottom views of the soldering-head; Figs. 6, 7, and 8 are sectional views of a modification in which the soldering-head is made of a plurality of pieces instead of in a single piece, the parts being shown separately in Figs. 6 and 7 and assembled in Fig. 8; Figs. 9, 10, and 11, are detailed views showing the connection between the cap which closes the solder-holding chamber and the rod to which said cap is secured; Figs. 9 and 10 showing one form of cap and Fig. 11 another form; and Figs. 12 and 13 are longitudinal sectional views of the soldering-head showing modified forms of the port.

The soldering-head 1 of the tool is provided with the pyramidal or tapered end 2, such as is found in the old-style soldering-iron. The body of the head may be of any desired shape, the drawings depicting a head which is square in transverse section. The head is hollow, and in the chamber or reservoir 3 which is formed therein the solder is retained, the solder being conveyed from said reservoir through a port or ports 4 to a point from which the solder will pass upon the joint or metal to be soldered.

The ports 4 may be variously shaped, Figs. 1 and 2 depicting a tapering port the exit end of which is the smaller, Fig. 13 showing a port approximately uniform throughout in diameter, and Fig. 12 showing a port the exit end of which is the larger, this form being preferable in some respects, since such a port is least likely to become clogged with slag. The port may lead from the reservoir 3 to the apex 5 of the pyramidal end 2, or it may terminate at some other convenient point, and, where there is more than one port, the exits may be distributed at intervals around the end 5 or otherwise suitably disposed.

In order that the workman can control the quantity of solder which passes through port 4 and regulate the speed with which the solder flows, the port is provided with some suitable valve, by adjustment of which valve the flow of the solder can be made to be fast or slow, or it can be shut off entirely. Preferably a needle valve, such as that illustrated in the drawings, is used, the point 6 of the valve projecting into port 4, and the shank 7 being screw-threaded so as to turn within a tap-hole 8 in the tapered end of head 1. The outer end 9 of the valve is grooved so that the valve can be turned one way or the other by the use of a screw-driver, the port 4 being opened or closed in accordance with the movements of the valve.

The head 1 may be made of a single piece of metal, as shown in Figs. 1 and 2, or, as shown in Figs. 6, 7, and 8, it may be made in a plurality of pieces. In the two-piece construction, the main body 10, in which the chamber 3 is formed, is provided with a screw-threaded boss 11, upon which boss the pyramidal end-piece 12 is screwed. The end-piece 12 is perforated at 13, and the body 10 and boss 11 are perforated at 14, said perforations registering when the parts composing the head are fastened together, forming an exit-port from chamber 3. By this arrangement the workman can quickly replace any end-piece with a new one whenever an end-piece becomes worn or broken, or when an end-piece of different shape is desired. The head, whether formed in one piece only or in a plurality of pieces, may be made of any suitable metal, iron or copper being those most frequently employed, copper being preferable to iron, even though copper is the more costly metal. Hence, by using the two-piece construction shown in Figs. 6, 7, and 8, and by making the end piece 12 of copper and the body 10 of iron, the workman can enjoy all the advantages of having a copper tool, since the end by which the spreading and manipulating of the solder is accomplished is made of copper, but at the same time, the cost of such a tool is much less than if the whole head were made of copper.

The head 1 is connected to the hand-grasp 15 by a rod 16, the preferred form of which is shown in Fig. 1, in which the rod is depicted as being hollow, and as terminating in arms 17 each of which is secured to head 1 by casting or in any other desired manner. The hand-grasp 15 is perforated at 18 and through the perforation therein the hollow rod 16 preferably extends, said rod being interiorly threaded at its outer end 19. A rod 20 is placed within the hollow member 16, said rod 20 bearing a screw threaded knob 21 at one end and a cap 22 at the other, which cap 22 serves to close the open end of the chamber 3. In Figs. 2, 12, and 13, rod 20 is shown as being held by a strap 23 to a grooved member 24, the construction shown in Fig. 2 otherwise being practically identical with that shown in Fig. 1.

The cap 22 is provided for closing the open end of chamber 3, and, in order that the cap may more effectively coöperate with the wall of the chamber, the edge 25 of the cap is beveled, as shown in Figs. 2 and 11, and fits into a beveled seat 26 formed in the head 1. The cap may, also, as shown in Figs. 1, 9, and 10, be constructed as a step-up member (or of two or more concentric disks joined together), the largest part of which step-up member (or the outermost of which disks) engages a shouldered seat or seats 26$^a$ formed in said head. The cap 22 carries a pair of short posts or studs 27. A pintle 28 extends from one of these members 27 to the other passing through a perforation 29 in the end of rod 20, thus securing cap 22 pivotally to rod 20. Any other device for fastening the rod and cap together may, of course, be employed, it being preferable, though not necessary, that the said members be pivotally connected, a pivotal connection being desirable in order that the cap may assume the position shown in Fig. 2, and thus allow easy access to the interior of the reservoir 3.

When it is desired to use the tool, the solder 30 is placed in the chamber 3, the rod 20 is moved longitudinally until the cap 22 rests upon or closely approaches the seat 26 or 26$^a$ at which time the threads 21 on the rod 20 will be engaging the threads 19 at the end of the hand-grasp 15, after which the rod 20 is turned, and, by the coöperation of the threads 19 and 21, the cap 22 is forced tightly upon seat 26 or 26$^a$ of head 1, thus hermetically closing the open end of reservoir 3 and preventing all egress of the solder even after same is molten, except through the port 4, regardless of the position to which the tool is turned. Since the cap 22 rotates as the rod 20 is turned, it is essential that the cap and the seat 26 or 26$^a$ upon which the cap seats be circular in shape. The main body of the reservoir 3, however, may be of any desired shape, being formed, for example, so as conveniently to receive ordinary stick solder.

After the solder has been placed in the chamber 3, the head 1 is heated, and the solder thus melted. The head may be heated either by placing same in an ordinary furnace, or by gas, or by electricity, suitable conducting tube or pipe for the gas or wires 32 for electricity being secured to the head 1 or otherwise connected thereto. The tool can, obviously, be used for soldering wires, and can be carried by linemen into positions where it would be very inconvenient to take a furnace, and yet it will be easy to keep the head at the proper temperature, by connecting the wires 32 to live wires. Since the chamber 3 is thus sealed by the cap 22, the passage of the solder out of the chamber tends to cause a vacuum, and, as the formation of such a vacuum interferes, of course, with the proper flow of the solder through port 4, it is necessary to provide some means for assisting the solder to flow through the port. One way of doing this is to apply to the metal which is to receive the solder a small quantity of rosin or of zinc dissolved in hydrochloric acid, or both, for these substances tend to draw the solder through the port 4 from the chamber, and, in addition, increase the degree of cohesion between the solder and the metal to be soldered. Another way is to use a special flux solder, which flows more readily than ordinary solder. It is possible, also, to loosen the cap 22 and allow access of air into the chamber 3, or air for the same purpose may be admitted through a valve or cock in cap 22, and thus permit the solder to feed through the port by gravity, but in cases where the tool is turned upside down, or even to horizontal position, this can not well be done. Still another way is to introduce compressed air into the interior of the solder reservoir after the cap 22 has been forced home.

The highest efficiency of the tool will be reached when it is used for soldering relatively long joints, such, for example, as the seams on cornices and metal roofs, the joints on very large cans and tanks, spouts, and the like, though it is adapted, of course, for any other kind of soldering.

While the foregoing description has had particular reference to a soldering tool suitable for manual operation, it should be understood that the invention can be used as an attachment for various machines, such, for example, as those used in can factories, or for canners' can-heading machinery, or for any other machine by which a joint must at some time be soldered. The solder-holding reservoir may be outside of the soldering-head, and one such reservoir may be connected by suitable pipes to a great number of soldering-heads. In can-heading machines, for example, the proper number of soldering-heads may be mounted upon a rotating mandrel, and carried in a circle around the can.

Having thus described my said invention, what I claim and desire to secure by Letters Patent is:

1. In a device of the character described, the combination of a head provided with a solder-holding chamber, a cap for closing the entrance to said chamber, and a rod for moving said cap toward or away from said entrance, said rod being pivotally connected to said cap.

2. A soldering tool embodying a chambered head having one end open and its opposite end provided with a solder discharge port, a cap for closing said open end, a rod secured to said cap, a handle, a hollow rod connected to the handle and head, said hollow rod at its outer end being interiorly threaded, and a screw threaded part on said rod of the cap, said rod of the cap passing through said hollow rod and having its screw threaded part engaged with said threads of the hollow rod, whereby said cap may be adjustably secured with respect to said head.

3. A soldering tool embodying a chambered head open at one end and provided with a solder discharge port at its opposite end, a handle connected to said head, a cap for closing said open end of the head, a rod, means for pivotally connecting said cap to said rod at one end of the latter, and means whereby said rod at its opposite end is adjustably connected with said handle so as to vary the pressure with which said cap may be brought to bear on said head.

4. A soldering tool embodying a chambered head open at one end and provided with a solder discharge port at its opposite end, a handle connected to said head and having a threaded socket, a cap for closing said open end of the head, a rod, means for pivotally connecting said cap to said rod, and a screw threaded part on said rod to engage said threaded socket whereby said cap may be brought to bear with desired pressure on said head.

5. A soldering tool embodying a chambered head open at one end and provided with a solder discharge at its opposite end, a handle connected to the head, a rod movably connected to the handle, and means for closing said open end of the chamber carried by said rod, said means being collapsible with respect to said rod to enable easy access to said chamber.

6. A soldering tool embodying a chambered head open at one end and provided with a solder discharge at its opposite end, said solder-discharge being an elongated outwardly-flaring passage, a handle connected to the head, a rod movably connected to the handle, and means for closing said open end of the chamber carried by said rod, said means being collapsible with respect to said rod.

In testimony whereof I affix my signature in presence of two witnesses.

HOWARD G. MEAD.

Witnesses:
EDNA J. GOCKEL,
GLADYS WALTON.